US012801418B2

(12) United States Patent
Koladi et al.

(10) Patent No.: US 12,801,418 B2
(45) Date of Patent: Nov. 17, 2026

(54) PERSISTING PERIPHERAL COMPONENT INTERCONNECT EXPRESS PASSTHROUGH CONFIGURATION IN A VIRTUALIZED ENVIRONMENT

(71) Applicant: Dell Products L.P., Round Rock, TX (US)

(72) Inventors: Krishnaprasad Koladi, Bengaluru (IN); Syama Sundar Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 18/425,952

(22) Filed: Jan. 29, 2024

(65) Prior Publication Data

US 2025/0245034 A1 Jul. 31, 2025

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01)

(58) Field of Classification Search
None
See application file for complete search history.

(56) References Cited

U.S. PATENT DOCUMENTS 10,824,349 B1 * 11/2020 Chan .................... G06F 3/0673
11,709,741 B1 * 7/2023 Uppal ................ G06F 11/0709 714/4.11
2020/0151010 A1 * 5/2020 Wadhwani ............ G06F 9/5011
2021/0011625 A1 1/2021 Samad et al.
2022/0043664 A1 * 2/2022 Singh ................. G06F 9/45558
2022/0091872 A1 * 3/2022 Huilgol ............... G06F 9/45558
2023/0118384 A1 * 4/2023 Frederick ............. G06F 13/102 710/6
2024/0202197 A1 * 6/2024 Ma ...................... G06F 16/285
2025/0123868 A1 * 4/2025 Ruiz .................. G06F 9/45558

OTHER PUBLICATIONS

Combined Search and Examination Report under Section 17 and 18(3) for corresponding application No. 2500168.6, 1-6, Intellectual Property Office (6 pages).

* cited by examiner

*Primary Examiner* — Wynuel S Aquino
(74) *Attorney, Agent, or Firm* — Chamberlain, Hrdlicka, White, Williams & Aughtry; Aly Z. Dossa

(57) ABSTRACT

Techniques described herein relate to a method for configuring components. The method may include identifying, by an operating system (OS) agent of a production host, a first change event, wherein: the production host comprises a plurality of components, and the plurality of components is used by a plurality of virtual machines (VMs) executing on the production host; making a first determination that the first change event is associated with a component of the plurality of components; and in response to making the first determination, updating a component mapping table based on the first change event.

20 Claims, 6 Drawing Sheets

Storage 122

Component Mapping Table (CMT) 130

| Component Slot Identifier 140 | Bus-Device-Function (BDF) 150 | Component Type 160 | Mapped VM Identifier 170 | Configuration Status 180 |
|---|---|---|---|---|
| Component Slot Identifier A 142 | BDF A 152 | Component Type A 162 | VM Identifier A 172 | Status A 182 |
| Component Slot Identifier B 144 | BDF B 154 | Component Type B 164 | VM Identifier B 174 | Status B 184 |
| Component Slot Identifier C 146 | BDF C 156 | Component Type C 166 | VM Identifier C 176 | Status C 186 |
| | | ● ● ● | | |
| Component Slot Identifier N 148 | BDF N 158 | Component Type N 168 | VM Identifier N 178 | Status N 188 |

Storage 122

Component Mapping Table (CMT) 130

| Component Slot Identifier 140 | Bus-Device-Function (BDF) 150 | Component Type 160 | Mapped VM Identifier 170 | Configuration Status 180 |
|---|---|---|---|---|
| Component Slot Identifier A 142 | BDF A 152 | Component Type A 162 | VM Identifier A 172 | Status A 182 |
| Component Slot Identifier B 144 | BDF B 154 | Component Type B 164 | VM Identifier B 174 | Status B 184 |
| Component Slot Identifier C 146 | BDF C 156 | Component Type C 166 | VM Identifier C 176 | Status C 186 |
| | | • • • | | |
| Component Slot Identifier N 148 | BDF N 158 | Component Type N 168 | VM Identifier N 178 | Status N 188 |

FIG. 1B

PERSISTING PERIPHERAL COMPONENT INTERCONNECT EXPRESS PASSTHROUGH CONFIGURATION IN A VIRTUALIZED ENVIRONMENT

BACKGROUND

Computing devices may provide services for users. To provide the services, the computing devices may include components. The components may be used to perform at least a portion of the services. The components may be removed or added to computing devices over time. Software of the computing devices, such as virtual machines, may use the components to provide the services. A computing device may include multiple VMs that each use one or more of the components. The components may be mapped to the VMs to enable the VMs to use the components.

SUMMARY

In general, in one aspect, the embodiments disclosed herein relate to a method performed to configure components. The method includes identifying, by an operating system (OS) agent of a production host, a first change event, wherein: the production host comprises a plurality of components, and the plurality of components is used by a plurality of virtual machines (VMs) executing on the production host; making a first determination that the first change event is associated with a component of the plurality of components; in response to making the first determination, updating a component mapping table based on the first change event; identifying a second change event; making a second determination that the second change event is associated with a VM of the plurality of VMs; in response to making the second determination, updating the component mapping table based on the second change event; and providing updated component mappings to an OS of the production host and the plurality of VMs, wherein the component mappings enable the plurality of VMs to use the plurality of components to perform computer implemented services.

In general, in one aspect, the embodiments described herein relate to a non-transitory computer readable medium which includes computer readable program code, which when executed by a computer processor enables the computer processor to perform a method for configuring components. The method includes identifying, by an operating system (OS) agent of a production host, a first change event, wherein: the production host comprises a plurality of components, and the plurality of components is used by a plurality of virtual machines (VMs) executing on the production host; making a first determination that the first change event is associated with a component of the plurality of components; in response to making the first determination, updating a component mapping table based on the first change event; identifying a second change event; making a second determination that the second change event is associated with a VM of the plurality of VMs; in response to making the second determination, updating the component mapping table based on the second change event; and providing updated component mappings to an OS of the production host and the plurality of VMs, wherein the component mappings enable the plurality of VMs to use the plurality of components to perform computer implemented services.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1B shows a diagram of a storage in accordance with one or more embodiments disclosed herein.

DETAILED DESCRIPTION

Figure 1A:
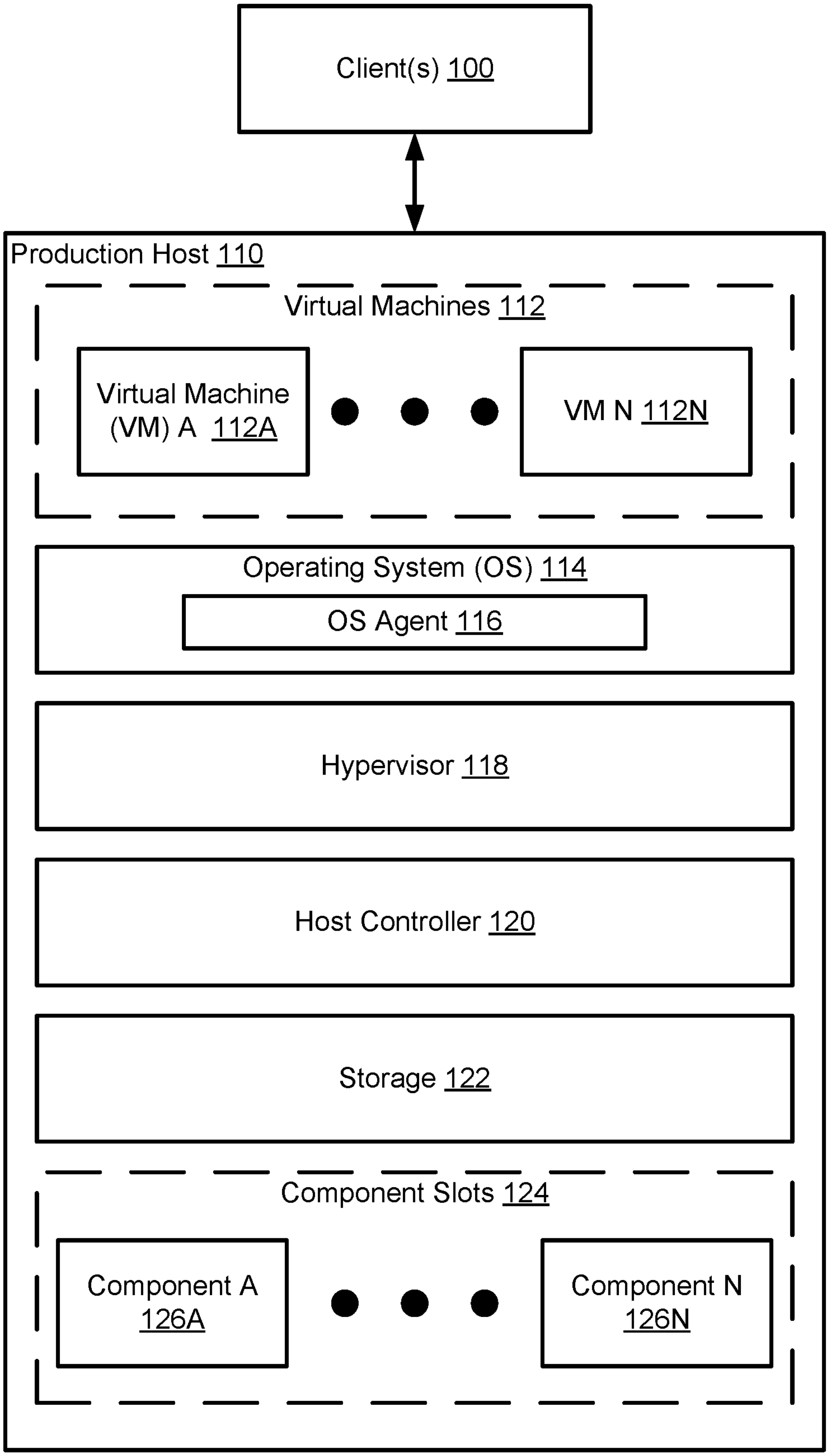
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for storing and updating device configuration in a virtualized environment.

Most virtual machine appliances may use the Peripheral Component Interconnect Express (PCIe) passthrough feature to get the best performance out of the device from the guest OS where computer implemented services are being run. For example, nonvolatile memory express (NVMe) storage devices assigned as a passthrough device may be a common use case for latency/performance intensive applications. Initial appliance VM configuration and device field replacement/maintenance of hot pluggable PCIe passthrough devices may both be extremely cumbersome. Certain tasks may be required in such scenarios such as safe removal of the device and reconfiguration of the newly added device to the VM/Container. These tasks may take administrator cycles and also increase the downtime when it comes to datacenter/cloud/edge use cases. Deployment and reconfiguration of passthrough devices may also apply as a use case when there is a field re-deployment of the operating system (OS) or hypervisor on baremetal servers. Currently there are no automated mechanisms available to do an auto reconfiguration of PCIe passthrough devices to corresponding VMs.

To address, at least in part, the aforementioned issues discussed above, embodiments disclosed herein relate to systems, methods, and/or non-transitory computer readable mediums that create a mapping between the PCIe device slot and the VM/Container ID during factory and runtime, store the configuration information in tables, and then provide the mapping data to the OS so that the PCIe passthrough reconfiguration is automated.

FIG. 1A shows a diagram of a system in accordance with one or more embodiments disclosed herein. The system may include a client(s) (100) and a production host (110). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the production host (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the production host (110) described herein and/or all, or a portion, of the methods illustrated in FIGS. 2-3B. The production host (110) may be implemented using other types of computing devices without departing from the embodiments disclosed herein. For additional details regarding computing devices, refer to FIG. 4.

The production host (110) may be implemented using logical devices without departing from the embodiments disclosed herein. For example, the production host (110) may include virtual machines that utilize computing resources of any number of physical computing devices to provide the functionality of the production host (110). The production host (110) may be implemented using other types of logical devices without departing from the embodiments disclosed herein.

In one or more embodiments, the production host (110) may include the functionality to, or otherwise be programmed or configured to, perform computer implemented services for client(s) (100) and users of the production host (110). In one or more embodiments the client(s) (100) may be implemented as one or more computing devices as discussed above. The computer implemented services may include electronic mail communication services, database services, calendar services, inferencing services, and/or word processing services. The computer implemented services may include other and/or additional types of services without departing from embodiments disclosed herein. To perform the computer implemented services for the client(s) (100), the production host (110) may further include the functionality to send/obtain data, requests, and/or other information to/from the client(s) (100). The production host (110) may include the functionality to perform all, or a portion, of the methods discussed in FIGS. 2-3B. The production host (110) may include other and/or additional functionalities without departing from embodiments disclosed herein.

As discussed above, the production host (110) may include the functionality to perform computer implemented services. To perform the aforementioned computer implemented services, the production host may include virtual machines (112), an operating system (OS) (114), an OS agent (116), a hypervisor (118), a host controller (120), storage (122), and component slots (124). The production host (110) may include other, additional, and/or fewer components without departing from embodiments disclosed herein. Each of the aforementioned components of the production host (110) is discussed below.

In one or more embodiments disclosed herein, the virtual machines (112) are implemented as computer instructions, e.g., computer code, stored on a storage (e.g., 122) that when executed by a processor of the production host (110) causes the production host (110) to provide the functionality of the virtual machines (112) described throughout this Detailed Description. The virtual machines may include the functionality to perform or otherwise provide at least a portion of the computer implemented services to the client(s) and/or users. The virtual machine may include other and/or additional functionalities without departing from embodiments disclosed herein. The virtual machines (VMs) (112) may include any quantity of virtual machines. For example, the VMs (112) may include VM A (112A) and VM N (112N). Additionally, each VM (e.g., 112A, 112N) may include one or more guest OSs (not shown in FIG. 1A) associated with the corresponding VM. VM functions; schedule tasks; mediate interactivity between logical (e.g., software) and physical (e.g., hardware) Each guest OS may, for example, support fundamental production host (110) components (e.g., 126A, 126N) using the component mapping table; allocate production host (110) resources; and execute or invoke other computer programs or computer instructions executing on the production host (110) associated with the corresponding VM. One of ordinary skill will appreciate that the guest OS may perform other functionalities without departing from the scope of the embodiments disclosed herein.

In one or more embodiments disclosed herein, operating system (OS) (114) implemented as computer instructions, e.g., computer code, stored on a storage (e.g., 122) that when executed by a processor of the production host (110) causes the production host (110) to provide the functionality of the OS (114) described throughout this Detailed Description.

In one or more embodiments disclosed herein, the OS (114) may be designed and configured to oversee production host (110) operations. To that extent, the OS (114) may include functionality to, for example, support fundamental production host (110) functions; schedule tasks; mediate interactivity between logical (e.g., software) (e.g., VMs (112)) and physical (e.g., hardware) production host (110) components (e.g., 126A, 126N) using the component mapping table; allocate production host (110) resources; and execute or invoke other computer programs or computer instructions executing on the production host (110). The OS (114) may include the functionality to perform all, or a portion, of the methods of FIGS. 2-3B. One of ordinary skill will appreciate that the OS (114) may perform other functionalities without departing from the scope of the embodiments disclosed herein. There may be one or more OSs included in the production host (110) without departing from embodiments disclosed herein.

In one or more embodiments disclosed herein, the operating system (OS) agent (116) may be implemented as computer instructions, e.g., computer code, stored on a storage (e.g., 122) that when executed by a processor of the production host (110) causes the production host (110) to provide the functionality of the OS agent (116) described throughout this Detailed Description. The OS agent (116) may be software component of the OS (114).

In one or more embodiments disclosed herein, the OS agent (116) may include the functionality to perform component table mapping services. The component table mapping services may include generating and updating, or initiating the generation and update of, the component mapping table based on configuration information. The component table mapping services may further include distributing or making available, the component mapping table to the OS (114), hypervisor (118), and/or the VMs (112). The component mapping table services may include other and/or additional services associated with the component mapping table (discussed below) without departing from embodiments disclosed herein. The OS agent (116) may further include the functionality to perform all, or a portion, of the methods of FIGS. 2-3B. The OS agent (116) may include other and/or additional functionalities without departing from embodiments disclosed herein. There may be one or more OS agents (116) each associated with one or more OSs (114), hypervisors (118), and/or VMs (112) without departing from embodiments disclosed herein.

In one or more embodiments disclosed herein, the hypervisor (118) may be implemented as computer instructions, e.g., computer code, stored on a storage (e.g., 122) that when executed by a processor of the production host (110) causes the production host (110) to provide the functionality of the hypervisor (118) described throughout this Detailed Description.

In one or more embodiments disclosed herein, the hypervisor (118) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the hypervisor (118) described throughout this Detailed Description.

In one or more embodiments disclosed herein, the hypervisor (118) may include the functionality to manage one or more of the VMs (112). The hypervisor (118) may generate, update, and facilitate communication of information and data between VMs (e.g., 112A, 112N) and between one or more of the VMs (112) and components (e.g., 116, 118, 120, 122, 124, 126A, 126N) of the production host (110). The hypervisor (118) may include the functionality to perform all, or a portion, of the methods of FIGS. 2-3B. The hypervisor (118) may include other and/or additional functionalities without departing from embodiments disclosed herein. In one or more embodiments disclosed herein, there may be a single hypervisor (118) associated with all VMs (112). In alternative embodiments, although not shown in FIG. 1A, there may be multiple hypervisors (118), each associated with one or more of the VMs (112).

In one or more embodiments disclosed herein, the host controller (120) may be implemented as computer instructions, e.g., computer code, stored on a storage (e.g., 122) that when executed by a processor of the production host (110) causes the production host (110) to provide the functionality of the host controller (120) described throughout this Detailed Description.

In one or more embodiments disclosed herein, the host controller (120) may be implemented as a physical device. The physical device may include circuitry. The physical device may be, for example, a field-programmable gate array, application specific integrated circuit, programmable processor, microprocessor, microcontroller, digital signal processor, a system-on-a-chip (SoC), or other hardware processor(s). The physical device may be configured to provide the functionality of the host controller (120) described throughout this Detailed Description.

In one or more embodiments disclosed herein, the host controller (120) may include the functionality to perform production host management services. The production host management services may include: (i) monitoring component slots (124), VMs (112), the OS (114) or other production host components not shown in FIG. 1A using sensors (e.g., temperature sensors, fan speed sensors, voltage sensors, etc.) and/or monitoring services to identify changes, (ii) generating and/or obtaining log information associated with the aforementioned changes, (iii) generating or obtaining configuration information (discussed below) associated with the component slots (124) and VMs (112) from the hypervisor (118), OS (114), and/or a user, and/or (iv) performing boots or power shutdowns of the production host (110). The production host management services may include performing out-of-band management. In other words, the host controller (120) may enable access and management (e.g., by the host controller (120) itself and/or users (e.g., system administrators)) to devices, components, and/or other infrastructure associated with the production host (110) at remote locations through a separate management network or plane from the production network or plane. Accordingly, a system administrator may monitor and manage the production host (110) regardless of whether the production host is powered on or the OS is functional. The host controller (120) may communicate with a user through any appropriate out-of-band network connection (e.g., an out-of-band LAN) without departing from embodiments disclosed herein. The host controller (120) may communicate with a user using a user interface (e.g., a graphical user interface (GUI), a command-line interface, a web interface, etc.) and any appropriate communication specification or protocol (e.g., Intelligent Platform Management Interface (IPMI)) without departing from embodiments disclosed herein. The production host management services may include other and/or additional services associated with the production host (110) without departing from embodiments disclosed herein. The host controller (120) may further include the functionality to perform all, or a portion, of the methods of FIGS. 2-3B. The host controller (120) may include other and/or additional functionalities without departing from embodiments disclosed herein.

In one or more embodiments disclosed herein, the storage (122) may be implemented using one or more volatile or non-volatile storages or any combination thereof. The storage (122) may include the functionality to, or otherwise be configured to, store and provide all, or portions, of information that may be used by the production host (110) or components thereof (e.g., 112A, 112N, 114, 116, 118, 120, 126A, 126N). The information stored in the storage (122) may include one or more data structures that include a component mapping table. The storage (122) may include other and/or additional information without departing from embodiments disclosed herein. For additional information regarding the storage (122) and the component mapping table (130, FIG. 1B), refer to FIG. 1B.

While the above data structures (e.g., 130) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (122), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

In one or more embodiments disclosed herein, the component slots (124) may be implemented as one or more physical interface connections that operatively connect removable components (e.g., 126A, 126N) to the production host (110). Components (e.g., 126A, 126N) may be added, removed, and/or replaced to/from the corresponding component slots (124) over time. There may be any quantity of component slots (124) without departing from embodiments disclosed herein. The component slots (124) may operatively connect the components (e.g., 126A, 126N) to the production host (110) using any appropriate expansion bus communication standard (e.g., Peripheral Component Interconnect Express (PCIe), Peripheral Component Interconnect (PCI), Peripheral Component Interconnect extended (PCI-X), Accelerated Graphics Port (AGP), etc.) to enable the transfer of data between the production host (110) (or components thereof such as the VMs (112)) and the components (126A, 126N) without departing from embodiments disclosed herein. The component slots (124) may be implemented using any software (e.g., computer instructions), cables, physical connectors, wires, circuitry, and/or any other components required to operatively connect the components (126A, 126N) to the production host (110) without departing from embodiments disclosed herein.

In one or more embodiments, the components (126A, 126N) may include the following hardware components: graphics cards, sound cards, hard disk drive host bus adapters, solid-state drives (SSDs) (e.g., Non-Volatile Memory Express (NVMe) drives), and/or network interface controllers (NICs). There may be any quantity of components (126A, 126N) without departing from embodiments disclosed herein. The components (126A, 126N) may include other and/or additional types of hardware components without departing from embodiments disclosed herein. The components (126A, 126N) may be used by the production host (110) and/or the VMs (112) to perform all, or a portion of, the computer implemented services. For example, a NIC may perform network services of the computer implemented services, a graphics card may perform graphics processing services of the computer implemented services, an SSD may perform data storage services of the computer implemented services, etc. The components (126A, 126N) may include other and/or additional functionalities without departing from embodiments disclosed herein.

Although the system of FIG. 1A is shown as having a certain number of components (e.g., 100, 110, etc.), in other embodiments disclosed herein, the system may have more or fewer components. For example, the functionality of each component described above may be split across components or combined into a single component. Further still, each component may be utilized multiple times to carry out an iterative operation. Further still, there may be multiple of each type of component (e.g., 112, 112A, 112N, 114, 116, 118, 120, 122, 124, 126A, 126N) of the production host (110).

FIG. 1B shows a diagram of a storage in accordance with one or more embodiments disclosed herein. The storage (122) may be an embodiment of the storage (122, FIG. 1A) discussed above. As discussed above, the storage (122) may store a component mapping table (CMT) (130). The CMT may be used to passthrough the removable components (e.g., 126A, 126N, FIG. 1A) to the VMs (112, FIG. 1A) executing on the production host (110, FIG. 1A). Said another way, the CMT (130) may provide the hypervisor (118), OS (114), and/or the VMs (112) the necessary CMT information to enable the VMs (112) to use components mapped to the VMs. The CMT (130) may be implemented using any appropriate type of table data structure without departing from embodiments disclosed herein.

As discussed above, the CMT (130) includes CMT information. The CMT information may include entries (e.g., rows shown in FIG. 1B) associated with components. There may be any quantity of entries associated with currently connected components or previously connected components (e.g., historical entries). Each entry may include a component slot identifier (140), bus-device-function (BDF) information (150), a component type (160), a mapped VM identifier (170), and a configuration status (180). The CMT information may include other and/or additional information associated with the components without departing from embodiments disclosed herein. Each of the aforementioned components of the CMT information is discussed below.

In one or more embodiments, a component slot identifier (140) may specify a particular component slot associated with a component. The component slot identifier (140) may specify the component slot that a component is currently connected to or was previously connected to if not currently connected. Each component slot may be associated with a different component slot identifier. For example, a first component slot may be associated with component slot identifier A (142), a second component slot may be associated with component slot identifier B (144), a third component slot may be associated with component slot identifier C (146), and an Nth component slot may be associated with component slot identifier N (148). There may be any quantity of component slots and thus any quantity of component slot identifiers without departing from embodiments disclosed herein. A component slot identifier (140) may be empty or set to a default value to indicate that the component associated with the entry has been removed and/or that the entry is a historical entry. A component slot identifier (140) may include other and/or additional information without departing from embodiments disclosed herein.

In one or more embodiments disclosed herein, the BDF information specifies a bus number, a device number, and a function number associated with the component corresponding to the entry. In one or more embodiments, a bus number specifies the switch to which the component is connected and allows the communication to be routed to the correct switch corresponding to the component. In one or more embodiments, the device number is used to identify the specific component within the switch to enable selection of the component by entities (e.g., VMs (112)) that desire to use the component. In one or more embodiments, the function number specifies one or more specific functions or capabilities associated with a component to enable users of the component to select the desired function. The BDF information enables the production host (110) or a VM to use the component corresponding to the BDF information. Each component in a component slot may be associated with BDF information. For example, a first component slot may be associated with a component with BDF A (152), a second component slot may be associated with a component with BDF B (154), a third component slot may be associated with a component with BDF C (156), and an Nth component slot may be associated with a component with BDF N (158). The BDF information (150) may include other and/or additional information associated with components without departing from embodiments disclosed herein.

In one or more embodiments, the component type (160) may specify the type of hardware component that corresponds to the component. The component type (140) may include a tag, identifier, flag, or other indicator of the type of hardware component. The component type (160) may specify whether the corresponding component is, for example, a graphics card, sound card, hard disk drive host bus adapter, solid-state drive (SSDs) (e.g., Non-Volatile Memory Express (NVMe) drives), and/or a NIC. The component type (160) may include additional information such as a vendor associated with the corresponding component, a version number associated with the corresponding component, a component identifier or product number, etc. without departing from embodiments disclosed herein. The component type may further specify whether the corresponding component is a physical component or a virtual component (e.g., single root I/O virtualization (SR-IOV) device) generated using at least a portion of a physical component. In one or more embodiments, each component or each entry may be associated with a component type. For example, a first component slot may be associated with a component with component type A (162), a second component slot may be associated with a component with component type B (164), a third component slot may be associated with a component with component type C (166), and an Nth component slot may be associated with a component with component type N (168). The component type (160) may include other and/or additional information associated with components without departing from embodiments disclosed herein.

In one or more embodiments, a mapped VM identifier (170) may specify a particular VM (e.g., 112A) of the VMs (112) that a corresponding component is mapped to. In other words, the mapped VM identifier (170) may specify the VM that uses the component associated with the entry. Each component, or entry, may be associated with a mapped VM identifier. For example, a first component slot may be associated with a component mapped to VM identifier A (172), a second component slot may be associated with a component mapped to VM identifier B (174), a third component slot may be associated with a component mapped to VM identifier C (176), and an Nth component slot may be associated with a component mapped to VM identifier N (178). There may be any quantity of component slots, components, and VMs, and thus any quantity of mapped VM identifiers without departing from embodiments disclosed herein. A mapped VM identifier (170) may be empty or set to a default value to indicate that the component associated with the entry is not currently mapped to a VM. A mapped VM identifier (170) may include other and/or additional information without departing from embodiments disclosed herein.

In one or more embodiments, the configuration status (180) may specify the status of a component associated with the entry. The configuration status (180) may include a tag, identifier, flag, or other indicator of the status of the component. The configuration status (180) may specify whether the corresponding component is, for example, active (e.g., ready for use and/or currently in use by a VM), inactive (not ready for use and/or not currently in use by a VM), powered-off (e.g., the component does not include power), connected, removed, mapped VM removed, and/or any other status associated with component. The configuration status (180) may be associated with a timestamp (e.g., a point in time corresponding when the status was changed to the current status). Each component, or entry, may be associated with a configuration status. For example, a first component slot may be associated with a component with status A (182), a second component slot may be associated with a component with status B (184), a third component slot may be associated with a component with status C (186), and an Nth component slot may be associated with a component with status N (188). The configuration status may include other and/or additional information associated with the status of a component without departing from embodiments disclosed herein.

Figure 2:
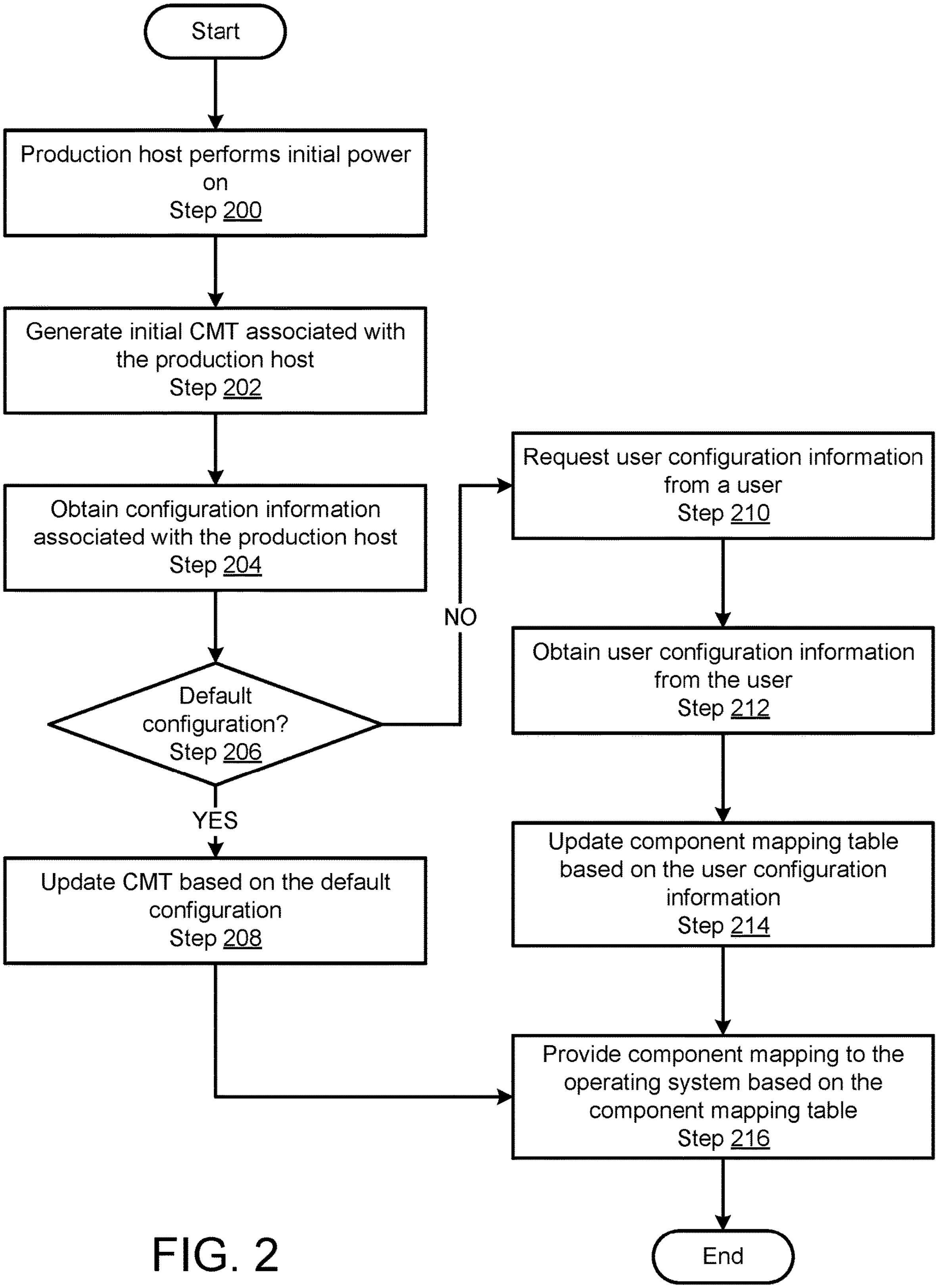
FIG. 2 shows a flowchart of a method for generating an initial component mapping table in accordance with one or more embodiments disclosed herein.

FIG. 2 shows a flowchart of a method for generating an initial component mapping table in accordance with one or more embodiments disclosed herein. The method shown in FIG. 2 may be performed by, for example, a production host (e.g., 110, FIG. 1A). Other components of the system in FIGS. 1A-1B may perform all, or a portion, of the method of FIG. 2 without departing from the scope of the embodiments described herein. While FIG. 2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, the production host performs an initial power on. In one or more embodiments, the production host may be shipped for the manufacturer and deployed in an environment (e.g., edge environment, data center, cloud environment, etc.). When connected to power and turned on (e.g., by a user or administrator input such as button press), the host controller of the production host may perform a boot by loading computing instructions in memory and executing, or initiating execution by one or more processors of the production host, the computing instructions. The production host may perform the initial power on via other and/or additional methods without departing from embodiments disclosed herein.

In Step 202, an initial CMT associated with the production host is generated. In one or more embodiments, the OS agent of the production host generates an initial CMT using initial configuration information. The initial configuration information may be stored in storage of the production host by the manufacturer or a user prior to the initial power on in Step 200. The initial configuration information may be one or more data structures that include the component slot identifiers associated with the component slots on the production host. The OS agent may generate an initial CMT with an entry associated with each component slot identifier included in the initial configuration information. The OS agent may leave other portions of the entries (e.g., component BDF information, component type, mapped VM identifier, and configuration status) empty or set to initial values/parameters. The OS agent may generate the initial CMT by performing any appropriate application programming interface (API) calls (e.g., Redfish API calls, Representational State Transfer (REST) API calls, etc.) with the initial configuration information to the host controller or other entity (e.g., service, server, processor, etc.) not shown in FIG. 1A capable of generating the CMT.

In alternative embodiments, an initial CMT associated with the production host may be manually generated by a user (e.g., a system administrator) and provided to the host controller via a user interface associated with the host controller and the user. As discussed above, the host controller may communicate directly with a user through any appropriate type of user interface and an out-of-band network. The user may provide to the host controller configuration information, which includes the initial configuration information to generate the initial CMT. Alternatively, the user may generate and directly provide the initial CMT through the user interface. The initial CMT may include an entry associated with each component slot identifier included in the initial configuration information. The initial CMT may include empty or set initial values/parameters for the other portions of the entries (e.g., component BDF information, component type, mapped VM identifier, and configuration status).

In yet additional alternative embodiments disclosed herein, the host controller directly generates the initial CMT using the initial configuration information. As discussed above, the initial configuration information may be stored in the storage of the production host and retrieved from the storage by the host controller, or the initial configuration information may be provided to the host controller by a user through the user interface associated with the host controller and the user. In one or more embodiments, the host controller may generate the initial CMT using a Device-Specific Method (_DSM) method defined in Basic Input/Output System (BIOS) and the initial configuration information to generate and update the initial CMT as an Advanced Configuration and Power Interface (ACPI) table. An ACPI table may refer to a table data structure of an ACPI-based system. BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The initial CMT associated with the production host may be generated via other and/or additional methods without departing from embodiments disclosed herein.

In Step 204, configuration information associated with the production host is obtained. As discussed above, the storage of the production host may include initial configuration information. In one or more embodiments, the initial configuration information may include configuration information. Also as discussed above, in some embodiments, the user may provide the configuration information to the host controller. The OS agent or the host controller may parse the initial configuration information to obtain the configuration information. The configuration information associated with the production host may be obtained via other and/or additional methods without departing from embodiments disclosed herein.

In Step 206, a determination is made as to whether the production host is associated with a default configuration. The host controller may parse the configuration information to determine whether the production host is associated with a default configuration. As discussed above, the configuration information may be one or more data structures that specify the component slot identifiers associated with the production host. The configuration information may further specify a default configuration. In one or more embodiments, a default configuration may refer to a common or specified initial configuration of components pre-attached to the component slots by a manufacturer or a user and automatically assigned to specific VMs of the production host. There may be one or more different types of default configurations each with different components installed in different component slots. In one or more embodiments disclosed herein, if the configuration information includes a default configuration, the host controller may determine that the production host is associated with a default configuration. In one or more embodiments disclosed herein, if the configuration information does not include a default configuration, the host controller may determine that the production host is not associated with a default configuration. The determination as to whether the production host is associated with a default configuration may be made via other and/or additional methods without departing from embodiments disclosed herein.

In one or more embodiments disclosed herein, if it is determined that the production host is associated with a default configuration, then the method proceeds to Step 208. In one or more embodiments disclosed herein, if it is determined that the production host is not associated with a default configuration, then the method proceeds to Step 210.

In Step 208, the CMT is updated based on the default configuration. In one or more embodiments, the OS agent of the production host updates the CMT using the default configuration specified by the configuration information. The default configuration may specify initial BDF information, component types, mapped VM identifiers, and configuration statuses associated with each of the component slot identifiers. The OS agent may update the entry associated with each component slot identifier with the CMT information associated with the component slot identifier included in the default configuration. The OS agent may update the initial CMT by performing any appropriate application programming interface (API) calls (e.g., Redfish API calls, Representational State Transfer (REST) API calls, etc.) with the CMT information included in the default configuration to the host controller or other entity (e.g., service, server, processor, etc.) not shown in FIG. 1A capable of updating the CMT.

In alternative embodiments, an initial CMT associated with the production host may be manually updated by a user (e.g., a system administrator) and provided to the host controller via a user interface associated with the host controller and the user. As discussed above, the host controller may communicate directly with a user through any appropriate type of user interface and an out-of-band network. The user may provide to the host controller the default configuration (See Steps 210-212), which includes the CMT information to update the initial CMT and the host controller may update the CMT as discussed below. Alternatively, the user may update and directly provide the updated CMT through the user interface. The updated CMT may include initial BDF information, component types, mapped VM identifiers, and configuration statuses associated with each of the component slot identifiers in each entry as specified by the default configuration.

In yet additional alternative embodiments disclosed herein, the host controller directly updates the initial CMT using the default configuration. As discussed above, the default configuration may specify initial BDF information, component types, mapped VM identifiers, and configuration statuses associated with each of the component slot identifiers. In one or more embodiments, the host controller may update the initial CMT using the _DSM method defined in BIOS and the default configuration to update the initial CMT.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated based on the default configuration via other and/or additional methods without departing from embodiments disclosed herein.

In Step 210, user configuration information is requested from a user. In one or more embodiments, the host controller may message or prompt a user to provide user configuration information through a user interface (e.g., a graphical user interface, a command-line interface, a web interface, etc.) via an out-of-band network connection with the user. The message or prompt may include a request to input CMT information associated with a user-configured component configuration (e.g., a non-default configuration). User configuration information may be requested from a user via other and/or additional methods without departing from embodiments disclosed herein.

In Step 212, user configuration information is obtained from the user. In one or more embodiments, in response to the prompt, a user may input CMT information associated with the production host via the user interface (e.g., by checking boxes, selecting options, and/or entering information via a keyboard, touchscreen, mouse, etc.). The host controller may obtain and/or extract the CMT information from the user interface. User configuration information may be obtained from the user via other and/or additional methods without departing from embodiments disclosed herein.

In Step 214, the CMT is updated based on the user configuration information. In one or more embodiments, the OS agent of the production host updates the CMT using the user configuration information. The default configuration may specify initial BDF information, component types, mapped VM identifiers, and configuration statuses associated with each of the component slot identifiers. The OS agent may update the entry associated with each component slot identifier with the CMT information associated with the component slot identifier included in the user configuration information. The OS agent may update the CMT by performing any appropriate application programming interface (API) calls (e.g., Redfish API calls, Rest API calls, etc.) with the CMT information included in the user configuration information to the host controller or other entity (e.g., service, server, processor, etc.) not shown in FIG. 1A capable of updating the CMT.

In alternative embodiments, an initial CMT associated with the production host may be manually updated by a user (e.g., a system administrator) and provided to the host controller via a user interface associated with the host controller and the user. As discussed above, the host controller may communicate directly with a user through any appropriate type of user interface and an out-of-band network. The user may provide to the host controller a user configuration (See Steps 210-212), which includes the CMT information to update the initial CMT and the host controller may update the CMT as discussed below. Alternatively, the user may update and directly provide the updated CMT based on the user configuration through the user interface. The updated CMT may include initial BDF information, component types, mapped VM identifiers, and configuration statuses associated with each of the component slot identifiers in each entry as specified by the user configuration.

In yet additional alternative embodiments disclosed herein, the host controller directly updates the initial CMT using the user configuration. As discussed above, the user configuration may specify initial BDF information, component types, mapped VM identifiers, and configuration statuses associated with each of the component slot identifiers. In one or more embodiments, the host controller may update the initial CMT using the _DSM method defined in BIOS and the user configuration to update the initial CMT.

BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated based on the user configuration via other and/or additional methods without departing from embodiments disclosed herein.

In Step 216, component mapping is provided to the operating system based on the CMT. In one or more embodiments, OS agent may provide all or a portion of the CMT information included in the current CMT to the OS of the production host. The OS may also distribute the CMT information to respective VMs and hypervisor(s) of the production host. The OS, VMs, and the hypervisor(s) may then use the CMT information of the CMT to passthrough the current configuration of components of the production host to the mapped VMs. As such, the CMT information of the CMT may enable the VMs to use the mapped components to perform computer implemented services. In alternative embodiments disclosed herein, the host controller may notify the VMs, hypervisor, OS, and/or the OS agent that the CMT is updated and/or expose the _DSM method to the VMs, hypervisor, OS, and/or the OS agent. As a result, the VMs, hypervisor, OS, and/or the OS agent and the may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS using the _DSM method. The CMT may be automatically updated via the method of FIGS. 3A-3B when components or VMs are added, removed, or reconfigured. The component mapping may be provided to the operating system based on the CMT via other and/or additional methods without departing from embodiments disclosed herein.

In one or more embodiments disclosed herein, the method ends following Step 216. The method of FIG. 2 may be performed prior to deployment of the production host during the manufacturing process of the production without departing from embodiments disclosed herein.

Figure 3A:
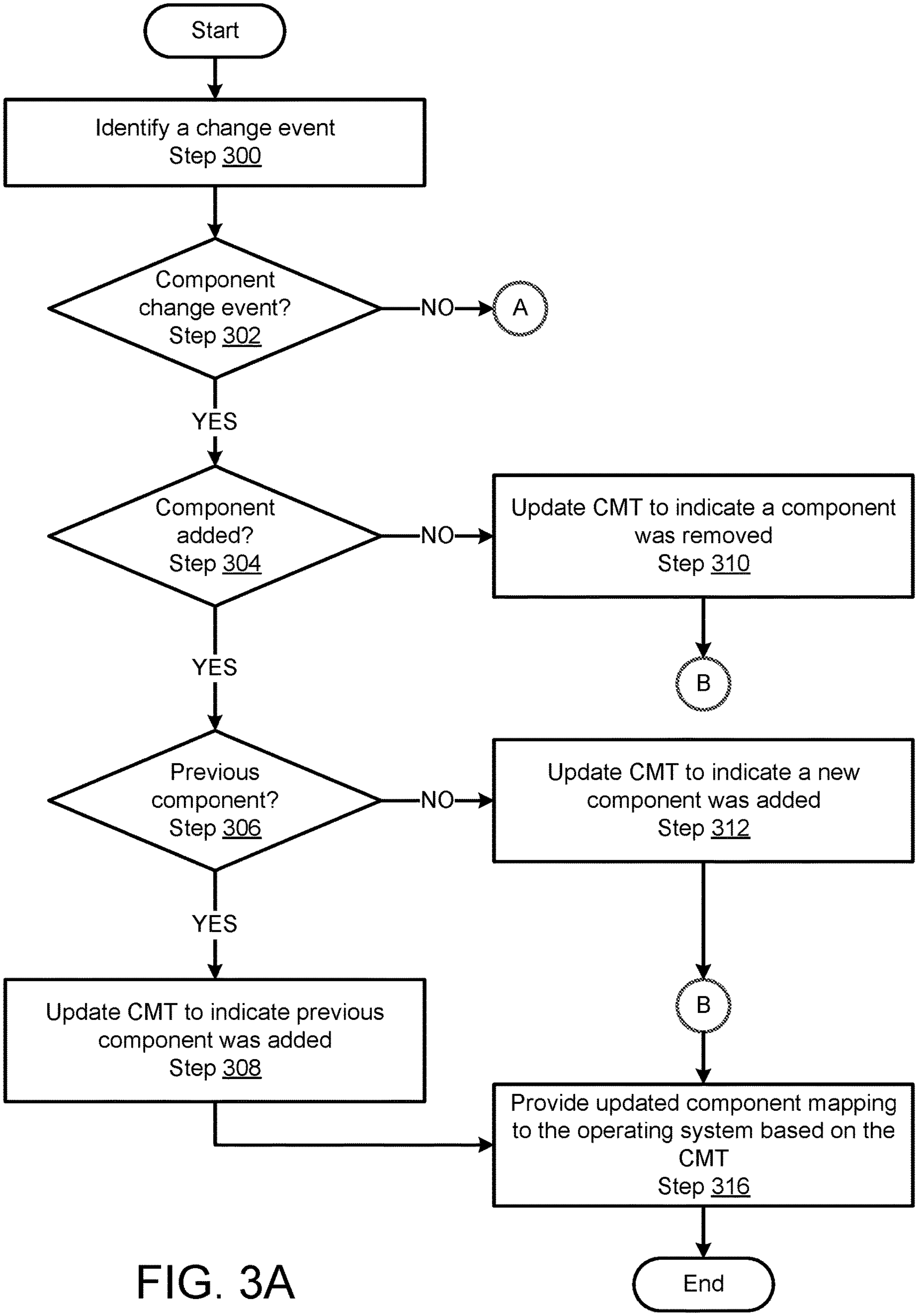
FIGS. 3A-3B show flowchart of a method for updating a component mapping table in accordance with one or more embodiments disclosed herein.
Figure 3B:
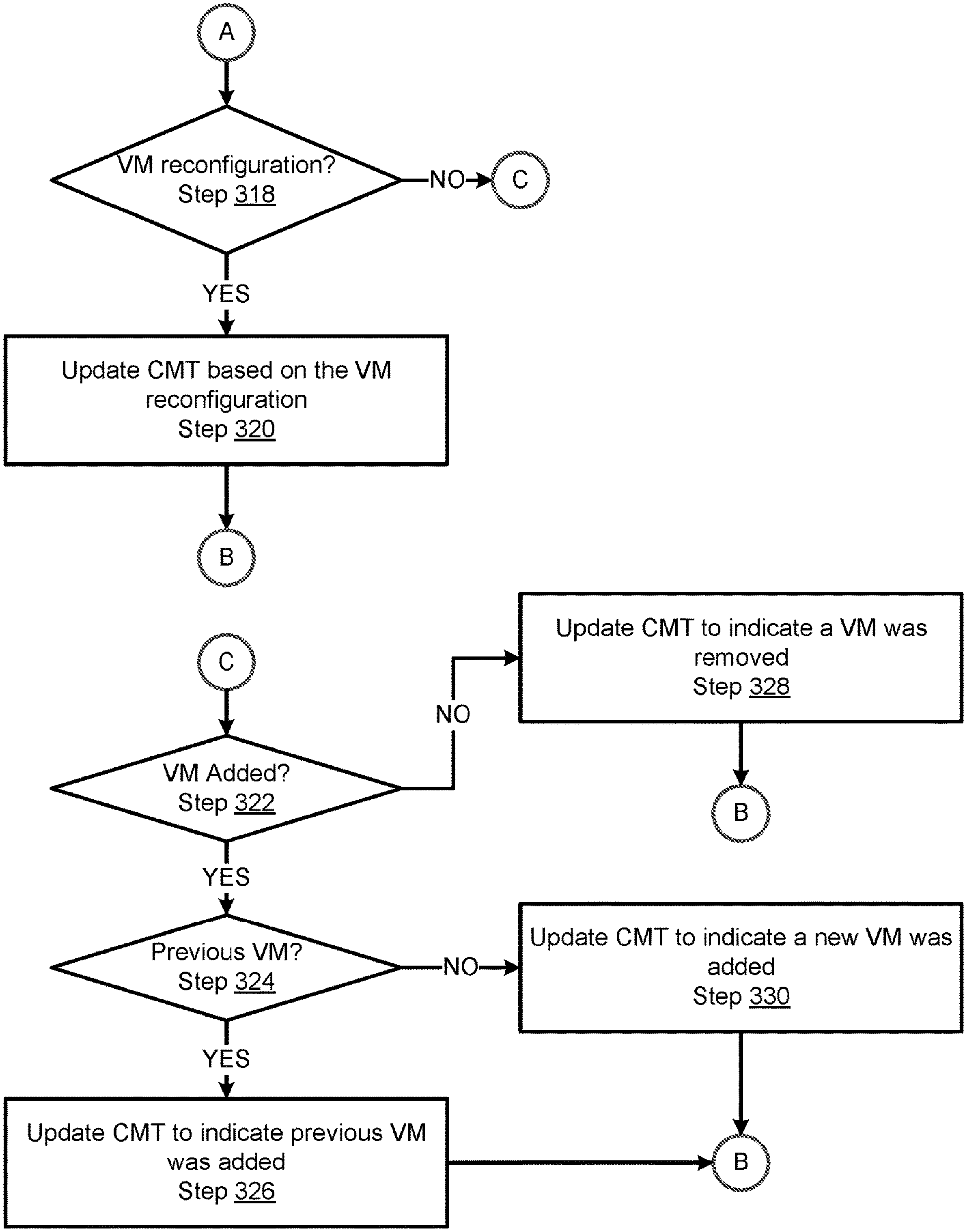

FIGS. 3A-3B show flowchart of a method for updating a component mapping table in accordance with one or more embodiments disclosed herein. The method shown in FIGS. 3A-3B may be performed by, for example, a production host (e.g., 110, FIG. 1A). Other components of the system in FIGS. 1A-1B may perform all, or a portion, of the method of FIGS. 3A-3B without departing from the scope of the embodiments described herein. While FIGS. 3A-3B are illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in FIG. 3A, in Step 300, a change event is identified. In one or more embodiments, the host controller or other entity (e.g., hardware monitor) may notify the OS agent when a component is changed. The notification may include log information associated with the change. A component change may include adding a component to a component slot or removing a component from a component slot. Similarly, the hypervisor or the host controller may notify the OS agent when a VM is changed. The notification may include log information. A VM change may include adding a VM, removing a VM, or reconfiguring components associated with a VM. The OS agent may identify the notifications received from the host controller and/or hypervisor associated with a component change or a VM change as a change event. The change event may be identified via other and/or additional methods without departing from embodiments disclosed herein.

In Step 302, a determination is made as to whether the change event is associated with a component change event. In one or more embodiments disclosed herein, the OS agent may check the log information associated with change event included in the notification corresponding with the change event. The log information may be one or more data structures that specify whether the change was associated with a VM or a component. In one or more embodiments disclosed herein, if the log information specifies that the change event is associated with a component, then the OS agent may determine that the change event is a component change event. In one or more embodiments disclosed herein, if the log information specifies that the change event is associated with a VM, then the OS agent may determine that the change event is not a component change event. The determination as to whether the change event is associated with a component change event may be made via other and/or additional methods without departing from embodiments disclosed herein.

In one or more embodiments disclosed herein, if it is determined that the change event is a component change event, then the method proceeds to Step 304. In one or more embodiments disclosed herein, if it is determined that the change event is not a component change event, then the method proceeds to Step 318 of FIG. 3B.

In Step 304, a determination is made as to whether the component change event is associated with an added component. The log information associated with the component change event may specify whether a component was added or removed to or from a component slot. In one or more embodiments, the OS agent may parse the log information to determine whether the change event is associated with an addition of a component or a removal of a component. In one or more embodiments disclosed herein, if the log information specifies that the change event is associated with an added component, then the OS agent may determine that a component was added. In one or more embodiments disclosed herein, if the log information specifies that the change event is associated with a removal of a component, then the OS agent may determine that a component was not added (component was removed). The determination as to whether the change event is associated with an added component may be made via other and/or additional methods without departing from embodiments disclosed herein.

In one or more embodiments disclosed herein, if it is determined that the change event is associated with an added component, then the method proceeds to Step 306. In one or more embodiments disclosed herein, if it is determined that the change event is not associated with an added component (it is associated with a removed component), then the method proceeds to Step 310.

In Step 306, a determination is made as to whether the added component is a previous component. In one or more embodiments, the component may be a component that was previously removed from a component slot. The OS agent may compare a component identifier included in the log information with component identifiers included in the entries of the CMT. In one or more embodiments disclosed herein, if the component identifier included in the log information matches a component identifier included in the CMT, then the OS agent may determine that the component is a previous component. In one or more embodiments disclosed herein, if the component identifier included in the log information does not match a component identifier included in the CMT, then the OS agent may determine that the component is not a previous component (e.g., the component is a new component). The determination as to whether the added component is a previous component may be made via other and/or additional methods without departing from embodiments disclosed herein.

In one or more embodiments disclosed herein, if it is determined that the added component is a previous component, then the method proceeds to Step 308. In one or more embodiments disclosed herein, if it is determined that the added component is not a previous component, then the method proceeds to Step 312.

In Step 308, the CMT is updated to indicate a previous component was added. In one or more embodiments, the OS agent of the production host updates the CMT using the log information. The OS agent may update the configuration status, and if installed into a new component slot, the component slot identifier included in the entry associated with the previous component. The log information may specify the component slot identifier and the configuration status associated with the added component. Additionally, if the component is mapped to a new VM as specified by the log information, the OS agent may then update the mapped VM identifier associated with the entry corresponding to the component using the mapped component identifier included in the log information. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the addition of a previous component and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the addition of the previous component. The updated CMT may include the component slot identifier and the configuration status associated with the added component. Additionally, if the component is mapped to a new VM as specified by the log information, the updated CMT may include the updated mapped VM identifier associated with the entry.

In yet additional alternative embodiments disclosed herein, the host controller directly updates the initial CMT using the log information. The host controller may update the configuration status, and if installed into a new component slot, the component slot identifier included in the entry associated with the previous component. As discussed above, the log information may specify the component slot identifier and the configuration status associated with the added component. Additionally, if the component is mapped to a new VM as specified by the log information, the host controller may then update the mapped VM identifier associated with the entry corresponding to the component using the mapped component identifier included in the log information. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a previous component was added via other and/or additional methods without departing from embodiments disclosed herein.

In one or more embodiments disclosed herein, the method proceeds to Step 316 following Step 308.

In one Step 310, the CMT is updated to indicate the component was removed. In one or more embodiments, the OS agent of the production host updates the CMT using the log information. The OS agent may update the configuration status and the component slot identifier included in the entry associated with the removed component to indicate that the component was removed. The log information may specify the component slot identifier and the configuration status associated with the removed component. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the removal of the component and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the removal of the component. The updated CMT may include the updated configuration status and the component slot identifier included in the entry associated with the removed component to indicate that the component was removed.

In yet additional alternative embodiments disclosed herein, the host controller directly updates the initial CMT using the log information. Host controller may update the configuration status and the component slot identifier included in the entry associated with the removed component to indicate that the component was removed. The log information may specify the component slot identifier and the configuration status associated with the removed component. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a component was removed via other and/or additional methods without departing from embodiments disclosed herein.

In one or more embodiments disclosed herein, the method proceeds to Step 316 following Step 308.

In Step 312, the CMT is updated to indicate a new component was added. In one or more embodiments, the OS agent of the production host updates the CMT using the log information. The OS agent may update the CMT by generating a new entry in the CMT associated with the new component. The OS agent may include the component slot identifier, BDF information, component type, mapped VM identifier, and the configuration status included in the log information in the generated entry. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the addition of the new component and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the addition of the new component. The updated CMT may include a new entry associated with the newly added and the component slot identifier, BDF information, component type, mapped VM identifier, and the configuration status associated with the newly added component in the generated entry.

In yet additional alternative embodiments disclosed herein, the host controller directly updates the initial CMT using the log information. The host controller may update the configuration status and the component slot identifier included in the entry associated with the removed component to indicate that the component was removed. The log information may specify the component slot identifier and the configuration status associated with the removed component. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a new component was added via other and/or additional methods without departing from embodiments disclosed herein.

In Step 316, the updated component mapping is provided to the OS based on the CMT. In one or more embodiments, OS agent may provide all or a portion of the CMT information included in the updated CMT to the OS of the production host. The OS or OS agent may also distribute the CMT information to respective VMs and hypervisor(s) of the production host. The OS, VMs, and the hypervisor(s) may then use the CMT information of the CMT to pass-through the current configuration of components to the mapped VMs. As such, the CMT information of the CMT may be automatically updated and may enable the VMs to use the mapped components to perform computer implemented services even when components or VMs are reconfigured, newly created, added, or removed. In alternative embodiments disclosed herein, the host controller may notify the VMs, hypervisor, OS, and/or the OS agent that the CMT is updated and/or expose the _DSM method to the VMs, hypervisor, OS, and/or the OS agent. As a result, the VMs, hypervisor, OS, and/or the OS agent and the may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS using the _DSM method. The updated component mapping may be provided to the operating system based on the CMT via other and/or additional methods without departing from embodiments disclosed herein.

In one or more embodiments disclosed herein, the method ends following Step 316.

Turning to FIG. 3B, in Step 318, a determination is made as to whether the VM change is associated with a VM reconfiguration. The log information associated with the VM change event may specify whether a VM was added (e.g., a VM was created), removed, or reconfigured (mapped to different components installed on the production host). In one or more embodiments, the OS agent may parse the log information to determine whether the change event is associated with VM reconfiguration. In one or more embodiments disclosed herein, if the log information specifies that the change event is associated with a VM reconfiguration, then the OS agent may determine that a VM was reconfigured. In one or more embodiments disclosed herein, if the log information specifies that the change event is not associated with a VM reconfiguration, then the OS agent may determine that a VM was not reconfigured. The determination as to whether the VM change is associated with a VM reconfiguration may be made via other and/or additional methods without departing from embodiments disclosed herein.

In one or more embodiments disclosed herein, if it is determined that the VM change event is associated with VM reconfiguration, then the method proceeds to Step 320. In one or more embodiments disclosed herein, if it is determined that the change event is not associated with VM reconfiguration (it is associated with a removed or added VM), then the method proceeds to Step 322.

In Step 320, the CMT is updated based on the VM reconfiguration. In one or more embodiments, the OS agent of the production host updates the CMT using the log information. The log information may specify the VM identifier associated with the VM that is reconfiguring. The log information may further specify the component identifiers or component slot identifiers associated with components that are reconfigured to be mapped to the VM corresponding to the VM identifier. The OS agent may update the mapped VM identifier for all entries associated with component identifiers and/or component slot identifiers specified by the log information. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) and provided to the host controller via a user interface associated with the host controller and the user. As discussed above, the host controller may communicate directly with a user through any appropriate type of user interface and an out-of-band network. The user may provide to the host controller log information (See Steps 210-212), which includes the CMT information to update the initial CMT and the host controller may update the CMT as discussed below. Alternatively, the user may update and directly provide the updated CMT based on the VM reconfiguration through the user interface. The updated CMT may include updated mapped VM identifiers for all entries associated with component identifiers and/or component slot identifiers associated with the VM reconfiguration.

In yet additional alternative embodiments disclosed herein, the host controller directly updates the initial CMT using the log information. The log information may specify the VM identifier associated with the VM that is reconfiguring. The log information may further specify the component identifiers or component slot identifiers associated with components that are reconfigured to be mapped to the VM corresponding to the VM identifier. The host controller may update the mapped VM identifier for all entries associated with component identifiers and/or component slot identifiers specified by the log information. In one or more embodiments, the host controller may update the initial CMT using the _DSM method defined in BIOS and the user configuration to update the initial CMT.

BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated based on the VM reconfiguration via other and/or additional methods without departing from embodiments disclosed herein.

In one or more embodiments disclosed herein, the method may proceed to Step 316 in FIG. 3A following Step 320.

In Step 322, a determination is made as to whether the VM change is associated with an added VM. The log information associated with the VM change event may specify whether a VM was added, removed, or reconfigured (mapped to different components installed on the production host). In one or more embodiments, the OS agent may parse the log information to determine whether the change event is associated with an added VM. In one or more embodiments disclosed herein, if the log information specifies that the change event is associated with an added VM, then the OS agent may determine that a VM was added. In one or more embodiments disclosed herein, if the log information specifies that the change event is not associated with an added VM, then the OS agent may determine that a VM was not added (a VM was removed). The determination as to whether the VM change is associated with an added VM may be made via other and/or additional methods without departing from embodiments disclosed herein.

In one or more embodiments disclosed herein, if it is determined that the VM change event is associated with an added VM, then the method proceeds to Step 324. In one or more embodiments disclosed herein, if it is determined that the change event is not associated with an added VM (it is associated with a removed VM), then the method proceeds to Step 328.

In Step 324, a determination is made as to whether the added VM is a previous VM. In one or more embodiments, the VM may be a VM that was previously removed from the production host. The OS agent may compare a VM identifier included in the log information with VM identifiers included in the entries of the CMT. In one or more embodiments disclosed herein, if the VM identifier included in the log information matches a VM identifier included in the CMT, then the OS agent may determine that the VM is a previous VM. In one or more embodiments disclosed herein, if the VM identifier included in the log information does not match a VM identifier included in the CMT, then the OS agent may determine that the VM is not a previous component. The determination as to whether the added VM is a previous VM may be made via other and/or additional methods without departing from embodiments disclosed herein.

In one or more embodiments disclosed herein, if it is determined that the added VM is a previous VM, then the method proceeds to Step 326. In one or more embodiments disclosed herein, if it is determined that the added VM is not a previous VM, then the method proceeds to Step 330.

In Step 326, the CMT is updated to indicate a previous VM was added. In one or more embodiments, the OS agent of the production host updates the CMT using the log information. The OS agent may update the configuration status of all entries associated with the previous VM from mapped VM removed to active. The log information may specify the VM identifier associated with the added VM. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the addition or creation of a previous VM and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the addition or creation of the previous VM. The updated CMT may include the component slot identifier and the configuration status associated with the added component. Additionally, if the component is mapped to a new VM as specified by the log information, the updated CMT may include the updated mapped VM identifier associated with the entry.

In yet additional alternative embodiments disclosed herein, the host controller directly updates the initial CMT using the log information. The host controller may update the configuration status of all entries associated with the previous VM from mapped VM removed to active. The log information may specify the VM identifier associated with the added VM. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a previous VM was added via other and/or additional methods without departing from embodiments disclosed herein.

In one or more embodiments disclosed herein, the method proceeds to Step 316 of FIG. 3A following Step 326.

In Step 328, the CMT is updated to indicate a VM was removed. In one or more embodiments, the OS agent of the production host updates the CMT using the log information. The OS agent may update the configuration status of each entry with the VM identifier associated with the removed VM to indicate that the mapped VM has been removed. The log information may specify the VM identifier associated with the removed VM. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the removal of the VM and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the removal of the VM. The updated CMT may include the updated configuration status in the entries associated with the removed VM to indicate that the mapped VM has been removed.

In yet additional alternative embodiments disclosed herein, the host controller directly updates the initial CMT using the log information. The host controller may update the configuration status of each entry with the VM identifier associated with the removed VM to indicate that the mapped VM has been removed. The log information may specify the VM identifier associated with the removed VM. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a VM was removed via other and/or additional methods without departing from embodiments disclosed herein.

In one or more embodiments disclosed herein, the method proceeds to Step 316 of FIG. 3A following Step 328.

In Step 330, the CMT is updated to indicate a new VM is added. In one or more embodiments, the OS agent of the production host updates the CMT using the log information. The OS agent may update the CMT by switching the mapped VM identifier of one or more entries associated with component slot identifiers or component identifiers specified by the log information associated with the new added VM with the VM identifier associated with the new VM. The log information may specify the VM identifier associated with the new added VM. The OS agent may update the CMT by performing any appropriate application programming interface (API) calls (e.g., Redfish API calls, Rest API calls, etc.) with the CMT information included in the log information discussed above to the host controller or other entity (e.g., service, server, processor, etc.) not shown in FIG. 1A capable of updating the CMT.

In alternative embodiments, the CMT associated with the production host may be manually updated by a user (e.g., a system administrator) based on the addition (or creation) of the new VM and provided to the host controller via a user interface associated with the host controller and the user. As discussed above, the host controller may communicate directly with a user through any appropriate type of user interface and an out-of-band network. The user may provide to the host controller the log information (e.g., similar to the methods discussed above. See Steps 210-212), which includes the CMT information to update the CMT and the host controller may update the CMT as discussed below. Alternatively, the user may update and directly provide the updated CMT through the user interface based on the addition or creation of the new VM. The updated CMT may include updated mapped VM identifiers including the VM identifier of the newly added or created VM for entries associated with components and/or component slots mapped to the newly added or created VM.

In yet additional alternative embodiments disclosed herein, the host controller directly updates the initial CMT using the log information. The host controller may update the CMT by switching the mapped VM identifier of one or more entries associated with component slot identifiers or component identifiers specified by the log information associated with the new added VM with the VM identifier associated with the new VM. The log information may specify the VM identifier associated with the new added VM. In one or more embodiments, the host controller may update the CMT using the _DSM method defined in BIOS and the log information.

As discussed above, BIOS may be firmware (e.g., computer instructions) executed by the host controller or other processor(s) of the production host to provide hardware management (e.g., booting processes, hardware initialization, etc.) for the production host. The VMs, hypervisor, OS, and/or the OS agent may access, make requests (e.g., API calls), trigger a system management mode (SMM) (e.g., an operating mode used to suspend normal execution of the processors of the production host to enable unimpeded and uninterrupted access to the CMT), and/or obtain information (e.g., CMT information) from the CMT included or otherwise maintained by the host controller via BIOS. The _DSM method may refer to a custom function, process, or routine included in BIOS for generating, updating, maintaining, and allowing access to the CMT or providing CMT information from the CMT.

The CMT may be updated to indicate a new VM was added via other and/or additional methods without departing from embodiments disclosed herein.

In one or more embodiments disclosed herein, the method proceeds to Step 316 of FIG. 3A following Step 330.

In one or more alternative embodiments disclosed herein, Steps 300-306, 318, and 322-324 may be performed by the host controller without departing from the embodiments disclosed herein.

Figure 4:
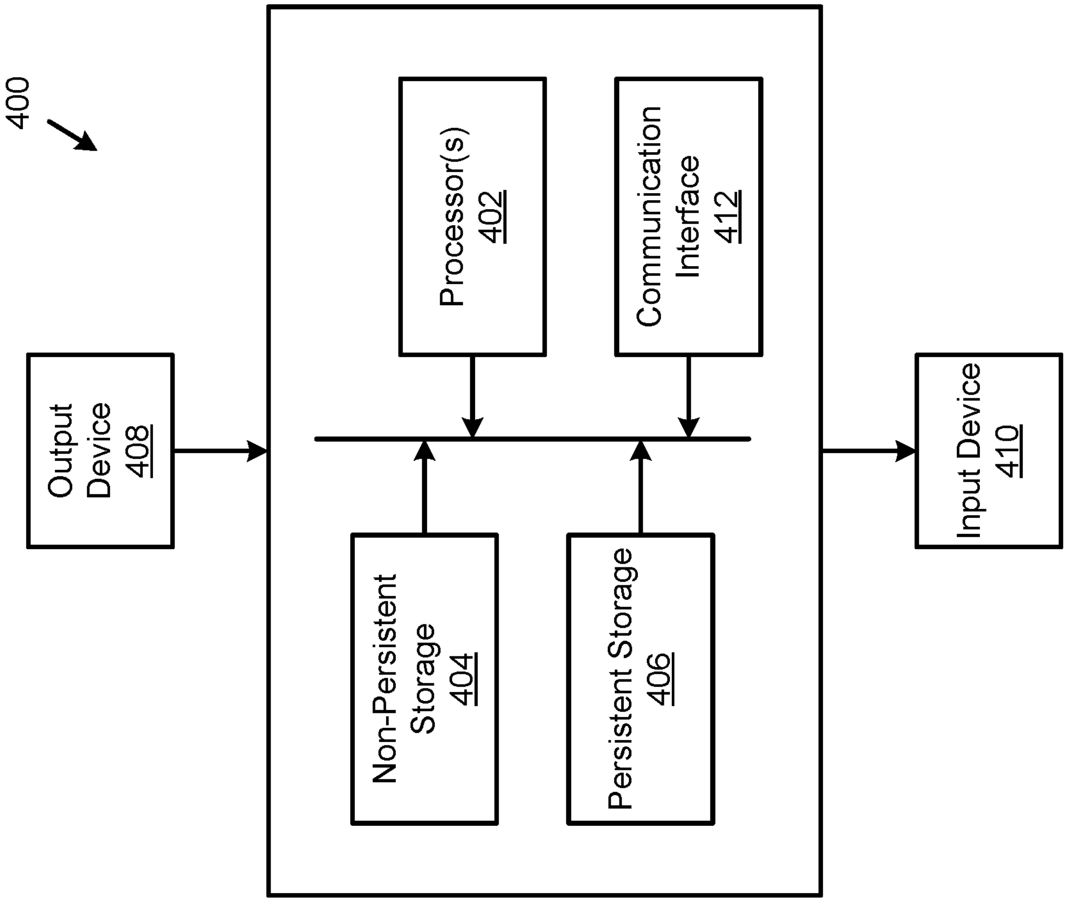
FIG. 4 shows a diagram of a computing device in accordance with one or more embodiments disclosed herein.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an identifier may refer to a unique combination of alphanumeric characters associated with an entity that specifies that particular entity. The identifier may be local (usable by a single component) or global (usable by all components).

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for configuring components, comprising:

identifying, by an operating system (OS) agent of a production host, a first change event, wherein:

the production host comprises a plurality of components, and the plurality of components is used by a plurality of virtual machines (VMs) executing on the production host;

making a first determination that the first change event is associated with a component of the plurality of components based on log information associated with the change event, wherein the log information comprises a data structure specifying a change to a component;

in response to making the first determination, updating a component mapping table based on the first change event to modify a mapping between the component and a VM of the plurality of VMs, wherein the updating is performed using one or more application programming interface (API) calls based on the log information to assign the component to the VM;

identifying a second change event;

making a second determination that the second change event is associated with a second VM of the plurality of VMs;

in response to making the second determination, updating the component mapping table based on the second change event; and providing updated component mappings to an OS of the production host and the plurality of VMs, wherein the component mappings are applied to reconfigure assignment of the plurality of components to the plurality of VMs and enable the plurality of VMs to use the plurality of components to perform computer implemented services, wherein one or more of the plurality of components are assigned to different VMs of the plurality of VMs.

2. The method of claim 1, wherein the plurality of components comprises peripheral devices operatively connected to the production host via Peripheral Component Interconnect (PCI) and Peripheral Component Interconnect Express (PCIe) connections.

3. The method of claim 2, where the component mapping table comprises entries for each component of the plurality of components specifying:

a component slot identifier, bus-device-function (BDF) information, a component type of component types, a mapped VM identifier, and a status.

4. The method of claim 3, wherein the mapped VM identifier comprises one selected from a group consisting of:

a VM identifier associated with the VM of the plurality of VMs mapped to a corresponding component of the plurality of components; and an indicator that the corresponding component of the plurality of components is not mapped to any of the plurality of VMs.

5. The method of claim 3, wherein the status specifies whether the component is active or inactive.

6. The method of claim 3, wherein the component types comprise:

a network interface controller, a host bus adapter, a graphics card, and a solid-state drive.

7. The method of claim 1, wherein updating the component mapping table based on the first change event comprises:

making a third determination that the first change event is associated with an addition;

in response to the third determination, making a fourth determination that the component is not specified in the component mapping table; and in response to the fourth determination, generating a new entry in the component mapping table associated with the component.

8. The method of claim 1, wherein updating the component mapping table based on the first change event comprises:

making a third determination that the first change event is associated with an addition;

in response to the third determination, making a fourth determination that the component is specified in the component mapping table; and in response to the fourth determination, updating an entry associated with the component in the component mapping table to change a status associated with the component from inactive to active.

9. The method of claim 1, wherein updating the component mapping table based on the second change event comprises:

making a third determination that the second change event is associated with a VM reconfiguration associated with a second component of the plurality of components; and in response to the third determination, updating an entry associated with the second component to include a new mapped VM identifier.

10. The method of claim 1, further comprising:

prior to identifying the first change event and after an initial boot of the production host:

generating an initial component mapping table associated with the production host;

obtaining configuration information associated with the production host;

making a third determination that the configuration information is associated with a default configuration;

in response to the third determination, updating the component mapping table based on the default configuration; and providing initial component mappings to the OS of the production host and the plurality of VMs, wherein the initial component mappings enable the plurality of VMs to use the plurality of components to perform computer implemented services.

11. A non-transitory computer readable medium comprising computer readable program code, which when executed by a computer processor enables the computer processor to perform a method for configuring components, the method comprising:

identifying, by an operating system (OS) agent of a production host, a first change event, wherein:

the production host comprises a plurality of components, and the plurality of components is used by a plurality of virtual machines (VMs) executing on the production host;

making a first determination that the first change event is associated with a component of the plurality of components based on log information associated with the change event, wherein the log information comprises a data structure specifying a change to a component;

in response to making the first determination, updating a component mapping table based on the first change event to modify a mapping between the component and a VM of the plurality of VMs, wherein the updating is performed using one or more application programming interface (API) calls based on the log information to assign the component to the VM;

identifying a second change event;

making a second determination that the second change event is associated with a second VM of the plurality of VMs;

in response to making the second determination, updating the component mapping table based on the second change event; and providing updated component mappings to an OS of the production host and the plurality of VMs, wherein the component mappings are applied to reconfigure assignment of the plurality of components to the plurality of VMs and enable the plurality of VMs to use the plurality of components to perform computer implemented services, wherein one or more of the plurality of components are assigned to different VMs of the plurality of VMs.

12. The non-transitory computer readable medium of claim 11, wherein the plurality of components comprises peripheral devices operatively connected to the production host via Peripheral Component Interconnect (PCI) and Peripheral Component Interconnect Express (PCIe) connections.

13. The non-transitory computer readable medium of claim 12, where the component mapping table comprises entries for each component of the plurality of components specifying:

a component slot identifier, bus-device-function (BDF) information, a component type of component types, a mapped VM identifier, and a status.

14. The non-transitory computer readable medium of claim 13, wherein the mapped VM identifier comprises one selected from a group consisting of:

a VM identifier associated with the VM of the plurality of VMs mapped to a corresponding component of the plurality of components; and an indicator that the corresponding component of the plurality of components is not mapped to any of the plurality of VMs.

15. The non-transitory computer readable medium of claim 13, wherein the status specifies whether the component is active or inactive.

16. The non-transitory computer readable medium of claim 13, wherein the component types comprise:

a network interface controller, a host bus adapter, a graphics card, and a solid-state drive.

17. The non-transitory computer readable medium of claim 11, wherein updating the component mapping table based on the first change event comprises:

making a third determination that the first change event is associated with an addition;

in response to the third determination, making a fourth determination that the component is not specified in the component mapping table; and in response to the fourth determination, generating a new entry in the component mapping table associated with the component.

18. The non-transitory computer readable medium of claim 11, wherein updating the component mapping table based on the first change event comprises:

making a third determination that the first change event is associated with an addition;

in response to the third determination, making a fourth determination that the component is specified in the component mapping table; and in response to the fourth determination, updating an entry associated with the component in the component mapping table to change a status associated with the component from inactive to active.

19. The non-transitory computer readable medium of claim 11, wherein updating the component mapping table based on the second change event comprises:

making a third determination that the second change event is associated with a VM reconfiguration associated with a second component of the plurality of components; and in response to the third determination, updating an entry associated with the second component to include a new mapped VM identifier.

20. The non-transitory computer readable medium of claim 11, further comprising:

prior to identifying the first change event and after an initial boot of the production host:

generating an initial component mapping table associated with the production host;

obtaining configuration information associated with the production host;

making a third determination that the configuration information is associated with a default configuration;

in response to the third determination, updating the component mapping table based on the default configuration; and providing initial component mappings to the OS of the production host and the plurality of VMs, wherein the initial component mappings enable the plurality of VMs to use the plurality of components to perform computer implemented services.

* * * * *